Figure 1:
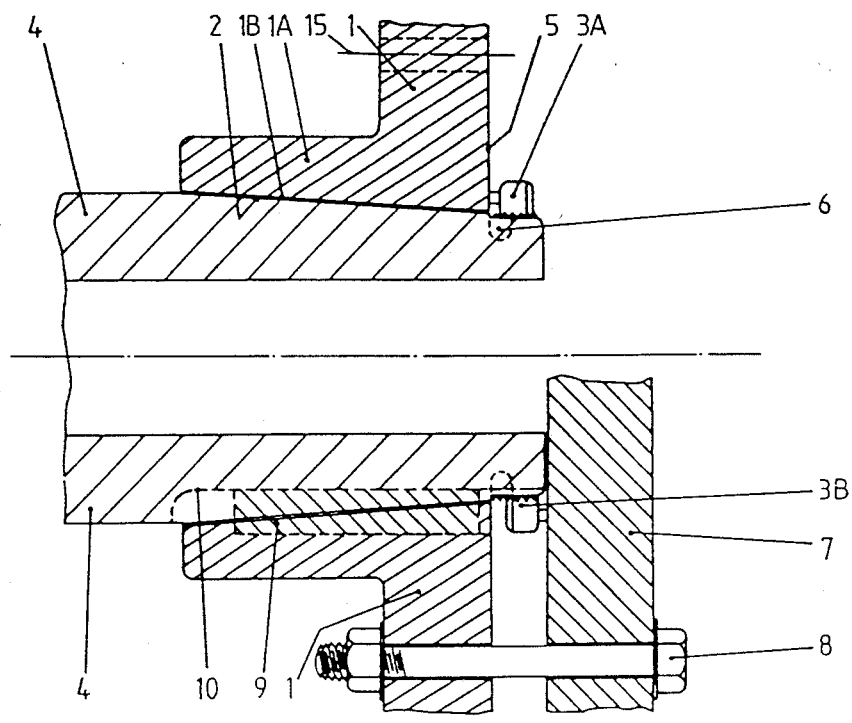

United States Patent [19]

Sutcliffe

[11] Patent Number: 4,925,415

[45] Date of Patent: May 15, 1990

[54] FRICTIONAL JOINTS

[75] Inventor: Frank Sutcliffe, Dalton-in-Furness, United Kingdom

[73] Assignee: Vickers Shipbuilding & Engineering Limited, Cumbria, United Kingdom

[21] Appl. No.: 212,774

[22] Filed: Jun. 29, 1988

[30] Foreign Application Priority Data

Jul. 2, 1987 [GB] United Kingdom ............... 8715540

[51] Int. Cl.[5] ............................................. B63H 23/34
[52] U.S. Cl. ...................................... 440/83; 29/252; 403/15
[58] Field of Search ...................... 440/83; 403/15, 16; 29/252; 416/244 R, 244 A, 244 B

[56] References Cited

U.S. PATENT DOCUMENTS

| 3,033,597 | 5/1962 | Miller | 403/15 |
| 3,772,759 | 11/1973 | Bunyan | 29/252 |
| 4,610,066 | 9/1986 | Cline | 29/252 |

Primary Examiner—Joseph F. Peters, Jr.
Assistant Examiner—Jesús D. Sotelo
Attorney, Agent, or Firm—Mason, Kolehmainen, Rathburn & Wyss

[57] ABSTRACT

A frictional joint between a first member and a second member is dismantled by means of a hydraulic nut fitted onto an external screw thread of the first member. The hydraulic nut acts on a separation ring having an external screw thread engaged with an internal screw thread in a co-axial recess provided in the second member.

8 Claims, 5 Drawing Sheets

FRICTIONAL JOINTS

This invention relates to frictional joints and is concerned with such joints which are formed between co-operating tapered members.

Such joints are often found in the fitting of ships' propellers to propeller shafts or the fitting of flanges at intermediate locations along propeller shafts. The means of securing the propeller, or flange, to the shaft may be solely due to frictional forces in the taper fit itself or due to a combination of frictional forces with other means, such as keyways.

The use of hydraulic nuts to assemble and dismantle large diameter taper fit joints is well known and such nuts are often used when assembling and dismantling propellers or flanges and propeller shafts. However, the dismantling stage hitherto has involved the use of large devices known as strongbacks. Frequently, and particularly in the case of submarines, there is insufficient space available to enable the strongback to be used.

It is an object of the present invention to enable taper fit joints to be dismantled without the need to use such strongbacks.

According to one aspect of the present invention there is provided a tapered frictional joint comprising (i) a first member including a part having an external tapered cross-section and a cylindrical portion co-axial with said part of the first member and provided with an external screw thread to receive a hydraulic nut capable of exerting an axial force in a first direction, and (ii) a second member including a part having an internal tapered cross-section compatible with the tapered cross-section of said part of the first member so that, by actuation of said nut, axial movement of the second member, with respect to said first member, occurs in said first direction whereby said tapered parts of the members become nested together and form a frictional joint, said second member also including an annular recess co-axial with said part of the second member and including an internal screw thread to receive an external screw thread provided on a separation ring whereby, when the separation ring is screwed into said recess, it forms an abutment surface against which the hydraulic nut may react, when mounted on said external screw thread of said first member in the opposite sense so as to be capable of exerting an axial force in a second direction opposite to said first direction, so that actuation of the hydraulic nut causes axial movement of said second member, with respect to said first member, in said second direction to separate the members thereby dismantling the joint.

When assembling the joint, the tapered part of said second member is forced onto the tapered part of said first member to form a strong frictional bond between said first and second members. This is effected by means of the hydraulic nut which is removably engaged with the screw thread of said first member in a first disposition and connected to a source of hydraulic power so that, under the influence of the hydraulic power a first load is exerted on said second member to force said second member onto said first member. When dismantling the joint the hydraulic nut is removably engaged with the screw thread of said first member in a second disposition, opposite to said first disposition and the separation ring is removeably engaged with the internal screw thread of said second member so that, under the influence of the hydraulic power, a second load is applied, in the opposite direction to said first load, onto said separation ring causing said strong bond between said first and second members to be broken.

Accordingly, another aspect of the present invention provides a method of dismantling a tapered frictional joint between (i) a first member including a part having an external tapered cross-section and a cylindrical portion co-axial with said part of the first member and provided with an external screw thread to receive a hydraulic nut, and (ii) a second member including a part having an internal tapered cross-section compatible with, and in frictional engagement with, the tapered cross-section of said part of the first member which method comprises (a) fitting a separate ring having an external screw thread into a coaxial annular recess provided in the second member and having an internal screw thread for engagement with the external screw thread of the separation ring, (b) fitting a hydraulic nut into the external screw thread of said first member, said hydraulic nut being capable of exerting an axial force on said separation ring in a direction tending to axially separate the first and second members and (c) actuating the hydraulic nut so as to displace axially and thus separate the first and second members.

Preferably, a removable means is incorporated in the joint to retain the second member on the first member once the strong bond has been formed.

Thus in a preferred application of the invention relating to a taper-fit joint in a submarine propulsion drive train, the first member is a tailshaft and the part thereof has a right circular external taper and the second member is a flange and the part thereof has a right circular internal taper. When making the tapered joint, the flange is placed over the tapered part of the shaft and the hydraulic nut is engaged with the tail shaft via the external screw thread on the tail shaft and a mating internal thread on the hydraulic nut. The hydraulic nut includes an axially displaceable piston and hydraulic pressure causes the piston of the nut to exert a force, axial with respect to the shaft and taper axes, (via a packing ring, if necessary) onto a suitable internal face of the flange, so forcing the tapered part of the flange onto the externally tapered part of the tailshaft.

After the taper joint has been made, the hydraulic pressure may be released and the hydraulic nut unscrewed. The joint may then be secured against loosening by vibration, etc. by fitting a second nut to the screw thread on the shaft. Alternatively, a circlip could be used.

To separate the taper joint (after the locking nut or circlip has been removed), the hydraulic nut is screwed onto the shaft in the reverse disposition, so that the annular piston faces away from the joint. A separation ring, with an external thread, is then screwed onto the internal thread of the recess in the flange. When hydraulic power is applied to the nut, the annular piston bears against the separation ring causing an axial load (away from the tapered joint) to be passed via the separation ring to the flange and hence to separate the two parts of the tapered joint.

The advantage of the present invention is that the size and weight of the separation ring is comparable with that of the hydraulic nut, e.g. 100–200 kg, whereas a conventional strongback would be two or more times the diameter and have ten or twenty times as much mass.

Though a cylindrical taper fit has been instanced as an example, it will be understood that not all taper fit sections are circular. The principle disclosed herein is equally applicable to non-circular fits.

The present invention is particularly useful for breaking tapered frictional joints in which the frictional forces are supplemented by Keys since oil injection cannot normally be used to separate joints of this type.

Figure 2:
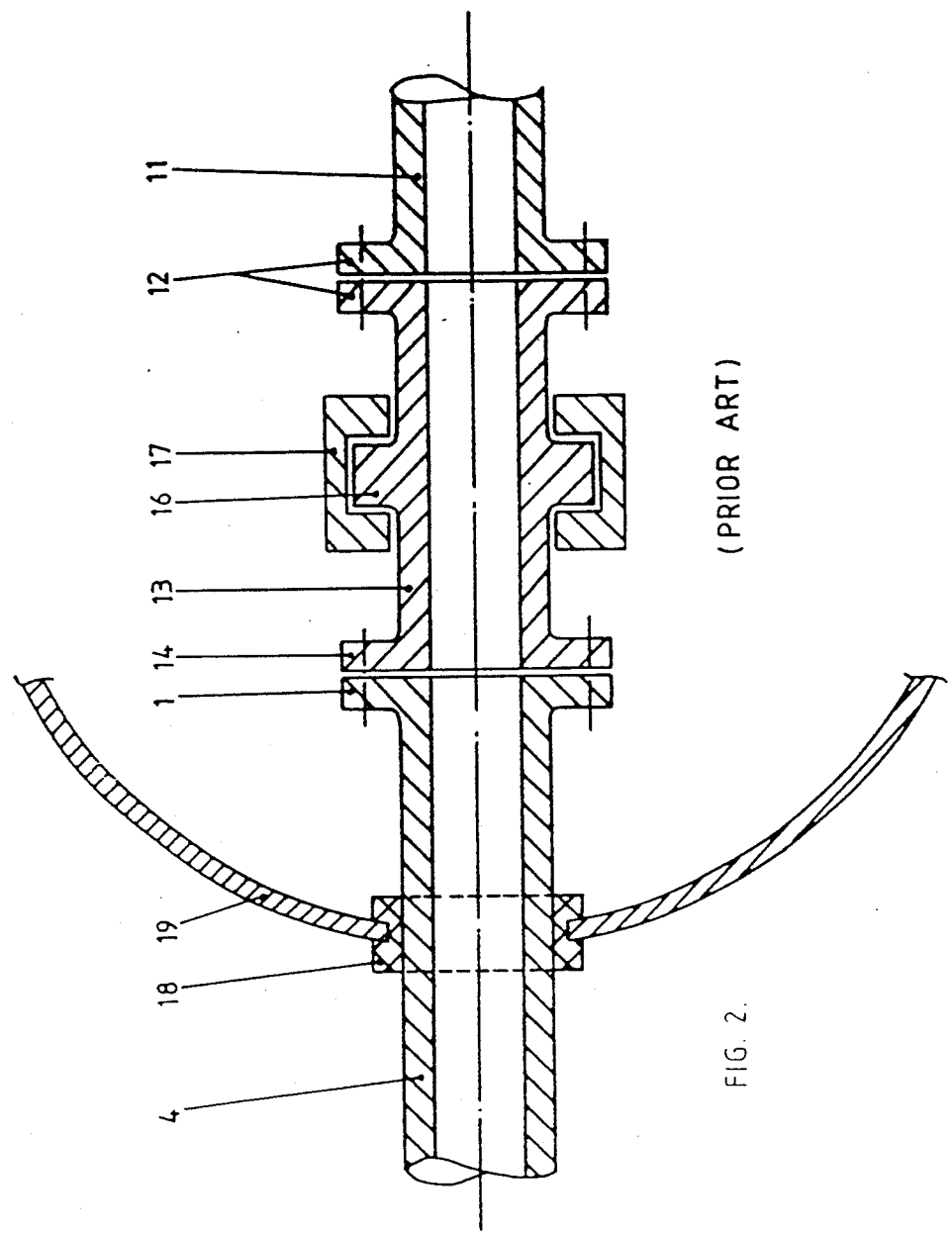
Figure 3:
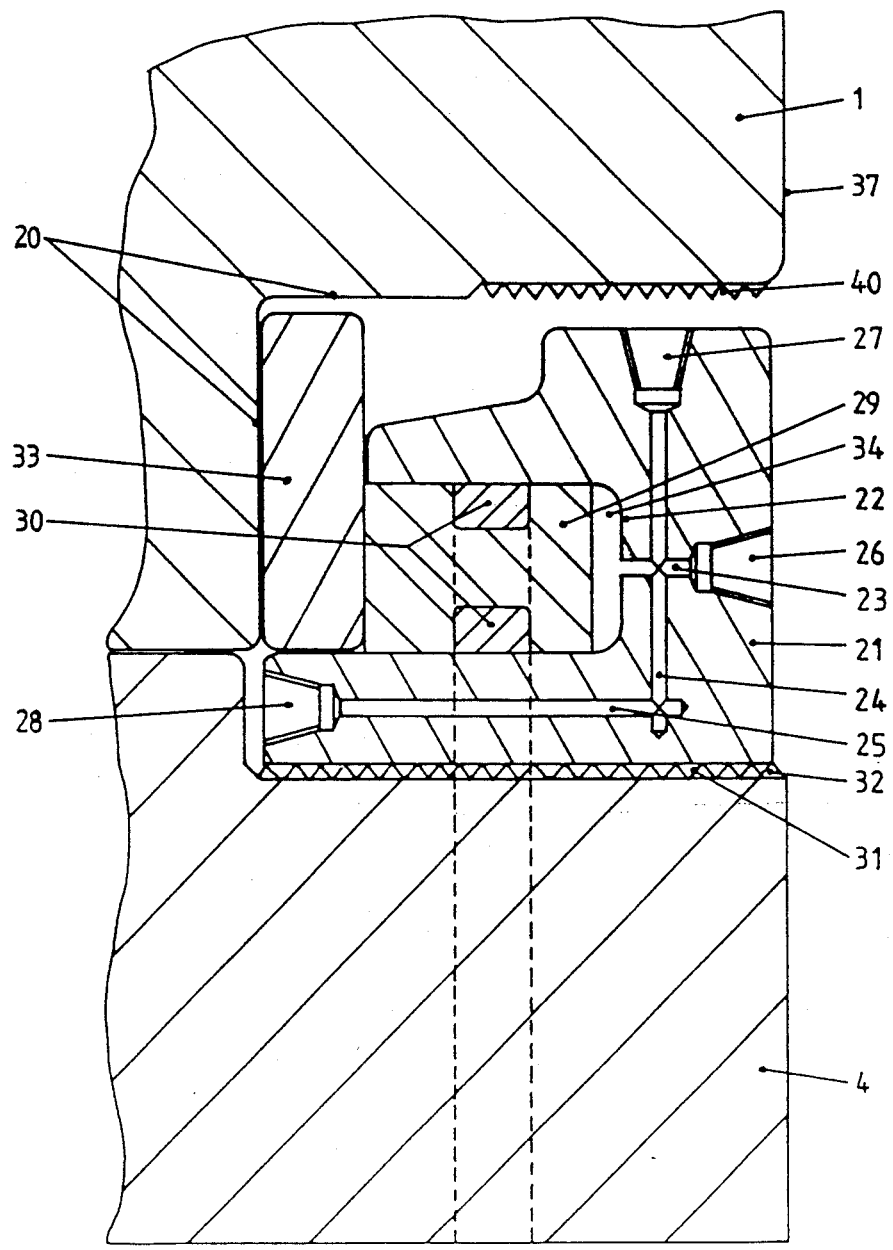
Figure 4:
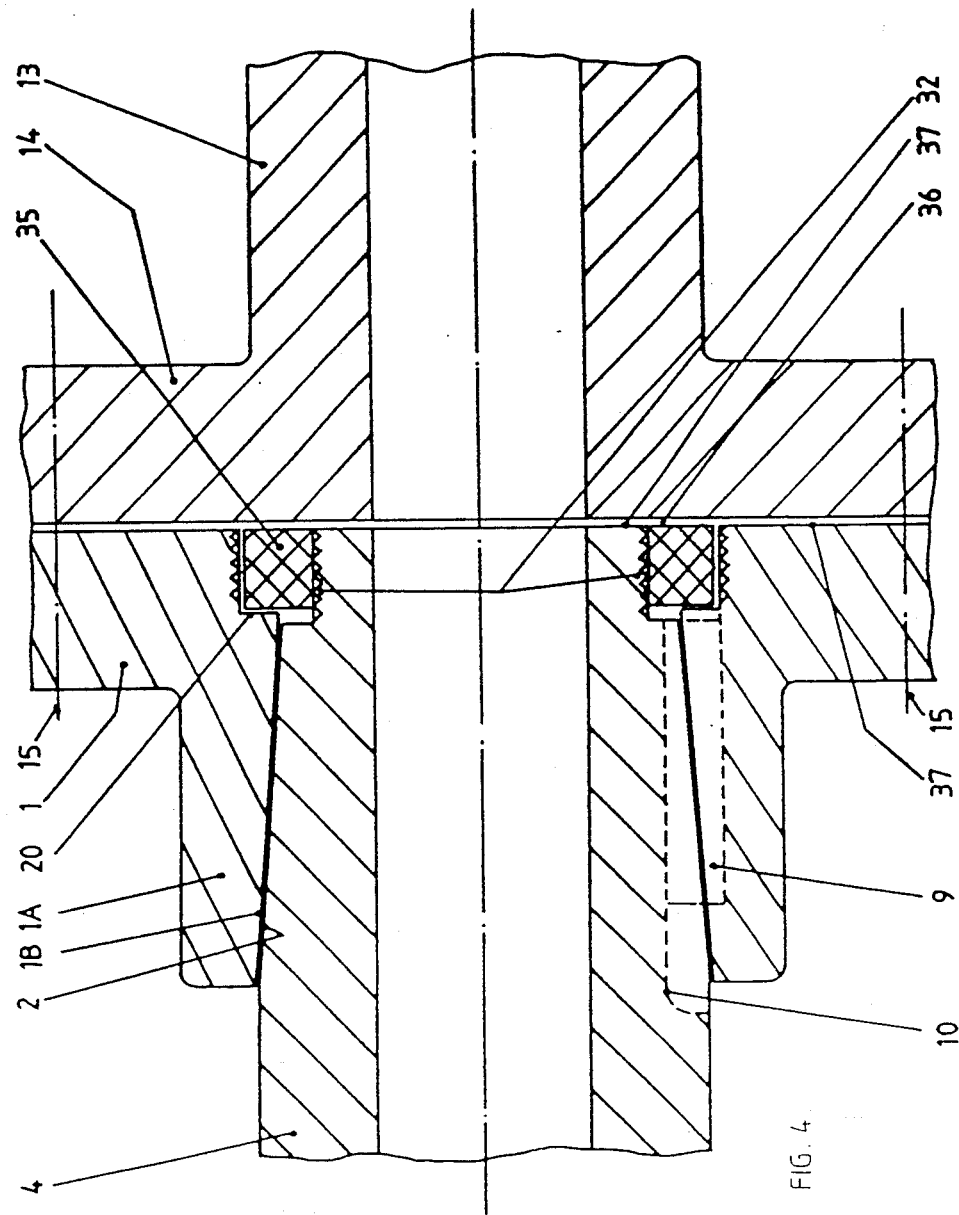
Figure 5:
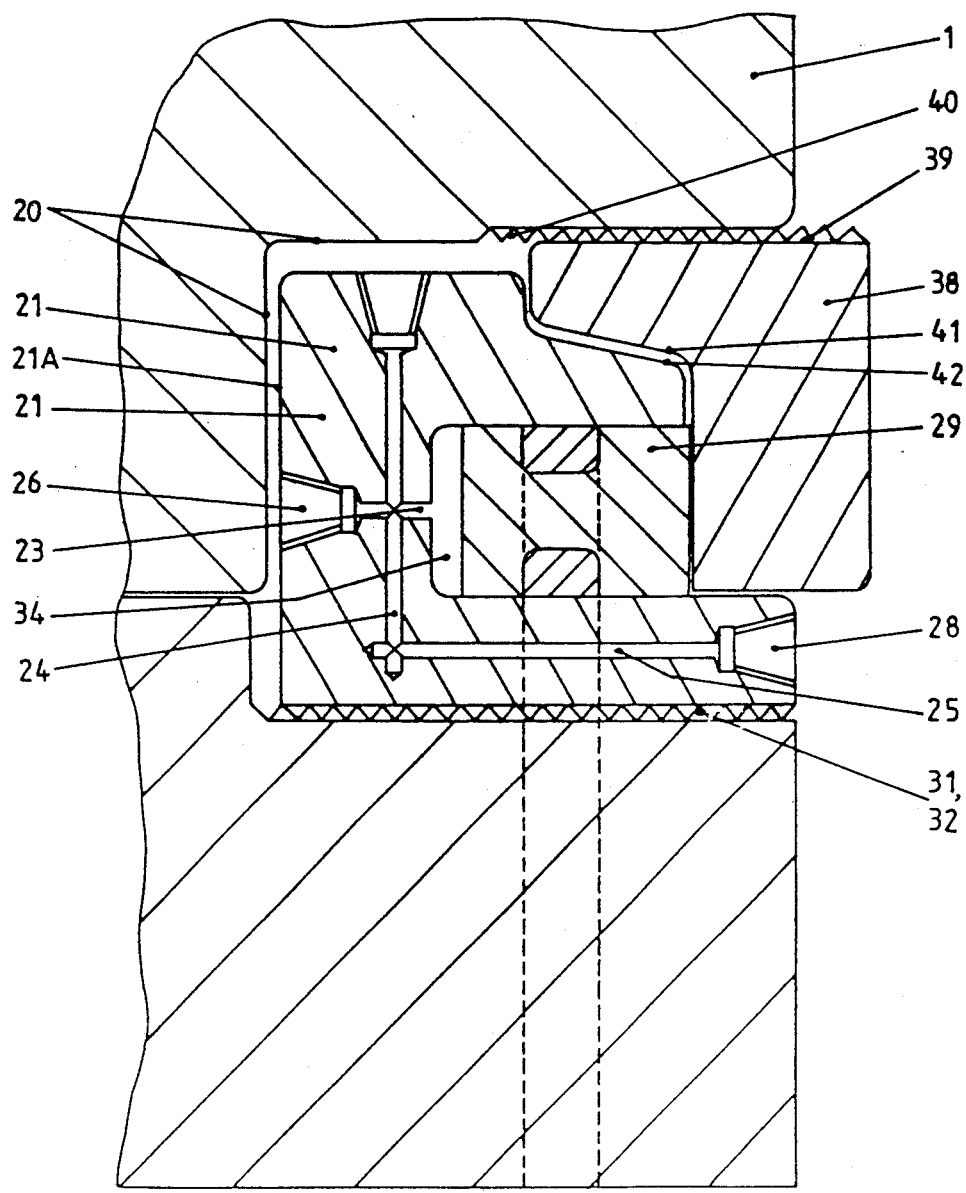

For a better understanding of the present invention and to show how the same may be carried into effect reference will now be made, by way of example, to the accompanying drawings, in which:

FIG. 1 is a sectional elevation showing, in the upper half, the fitting of a taper-fit flange onto a shaft and, in the lower half, the removal of the same in accordance with the prior art, FIG. 2 is a sectional elevation of the stern section of a submarine incorporating the shaft of FIG. 1, FIG. 3 is a part-sectional elevation through a taper-fit flange being fitted to a shaft to form a joint in accordance with the present invention, FIG. 4 is a sectional elevation showing the fitted flange of FIG. 3 locked into place and connected to a thrust shaft, and FIG. 5 is a part-sectional elevation through the joint of FIG. 3 showing removal of the flange from the shaft.

Referring now to FIG. 1, it shows, in the upper half the fitting of a second member in the form of a flange 1 onto a first member in the form of a propeller tail shaft 4, and in the lower half, the removal of the flange 1 from the shaft 4. Flange 1 includes part 1A having an internal tapered cross-section 1B and shaft 4 includes a part 2 having a corresponding externally tapered cross-section.

The shaft 4 also includes a cylindrical portion co-axial with the tapered part and provided with an external screw thread. When assembling the taper-fit joint, the flange 1 is placed on the shaft 4 so that their tapered parts are nested together and a hydraulic nut 3A is threaded on to the cylindrical portion of flange 1 until it contacts the boss 5 of the flange. The nut 3A includes an axially displaceable annular piston and hydraulic pressure is applied to the nut 3A to cause the annular piston to act on the flange boss 5 forcing flange 1 onto the tapered part 2. When the operation is complete, the hydraulic pressure is released and the nut 3A removed to be replaced by a simple lock nut (not shown) or circlip (not shown) in groove 6. To remove the flange 1, the lock nut or circlip (not shown) is removed and the hydraulic nut is replaced on the shaft 4 but in the reverse disposition in which it is denoted by reference 3B. A strongback 7 is then secured to the flange 1 via suitable means, e.g. bolts 8 and hydraulic pressure is applied to the nut 3B causing its piston to act on the strongback 7 and so pull the flange 1 off tapered part 2. In practice, the mechanical connection between flange 1 and shaft 4 may be entirely due to friction between the tapered parts 1A and 2 or be supplemented by the use of a key(s) 9 in a keyway(s) 10.

FIG. 1 shows the overall arrangement by which the internally tapered section 1B of the part 1A of the flange 1 fits over the externally tapered part 2 of the shaft 4. As the part 1A is forced onto tapered part 2, by the action of the hydraulic nut 3A, this form of joint is termed an "interference fit".

In the example of the prior art shown in FIG. 1, the strongback 7 has to be very massive. This presents no problems on a ship in drydock where there is adequate access for suitable cranes to handle the strongback 7. There is similarly no undue problem in the use of a strongback to remove a flange on the inboard end of a propeller shaft in the relatively cavernous engine room of modern ships. However, there are considerable problems if the inboard flange of the propeller shaft has to be removed in the confines of a submarine hull 19 (FIG. 2). Moreover, certain classes of submarine have higher power capabilities requiring larger diameter propeller shafts and thus these require larger and heavier strongbacks to service them.

The shafting arrangement in a typical submarine incorporating the joint of FIG. 1 is shown in FIG. 2. It includes an output shaft 11 from the gearbox (not shown) which connects via a flange 12 with a thrust shaft 13. Fixed flange 14 of the shaft 13 connects with the flange 1 fast with the tailshaft 4. To remove the tailshaft 4, it would be necessary to dismantle thrust block 17, disconnect flanges 12 and 14,1, remove the thrust shaft 13 to a storage location in that part of the submarine, bring in the strongback to remove the flange 1 and withdraw tailshaft 4 through seal 18 in pressure hull 19. In the case of higher powered submarines, the strongback could weight 2-3 tonnes and be physically so large that it would be a practical impossibility to bring it to the required part of the submarine without cutting the pressure hull.

There is thus a need for a means of fitting and removing taper-fit flanges using only components which are light and manageable in confined spaces.

Referring now to FIG. 3, this corresponds to part of FIG. 1 and illustrates the joint of the invention. Parts corresponding to parts of FIGS. 1 and 2 are denoted by like reference numerals. It can be seen that the boss 5 of the flange 1 has been cutaway to provide an annular recess 20 co-axial with the tapered part of the flange 1. In FIG. 3, the hydraulic nut is denoted by reference 21 and is made by machining a ring of a suitable material, e.g. steel. An annular channel 22 is machined into the body of the ring and a screw thread 31 is cut into the internal circumferential face, as shown. Conduits for the passage of hydraulic fluid 23, 24 and 25 are made by drilling interconnecting holes, as shown. The points where the drills enter the nut 21 are enlarged, tapped and sealed with removable plugs 26, 27 and 28 respectively. An annular piston 29, sealed by means of packing elements 30, is fitted into the annular channel 22. Conduits 23, 24 and 25 and the space 34 behind piston 29 are filled with hydraulic fluid.

To use the hydraulic nut 21 to fit a tapered flange, the procedure is as follows. The mating tapered surfaces 2, 1B (FIG. 1) of the flange 1 and shaft 4 are cleaned and lightly oiled and then the flange 1 is placed on the shaft 4 so that the internal taper 1B fits over externally tapered part 2 of shaft 4. Flange 1 is pushed on as far as possible until metal-to-metal contact has been made (FIG. 1, upper half). Hydraulic nut 21 is then screwed into position with the thread 31 mating with a matching external thread 32 on a cylindrical portion of shaft 4 co-axial with tapered part 2. A packing ring 33 is inserted between the end of piston 29 and the radial face of recess 20 if required. When hydraulic nut 21 is in position, as shown in FIG. 3, plug 26 is removed and a supply of hydraulic fluid is connected and pressurised causing it to flow through conduit 23 into space 34 to drive piston 29 to the left so that it exerts a force on flange 1 via ring 33. As space 34 and piston 29 are annular, a uniform force is exerted over the whole circumference of the tapered part 2. As the flange 1 moves along tapered part 2, it may be necessary to release the hydraulic pressure, tighten hydraulic nut 21 by screwing it further to the left, and restore the pressure. The pressure would be raised to a suitable value so that a predetermined axial force, e.g. 100 tonnes would be applied to flange 1.

Once the required axial force has been achieved, friction between the tapered surfaces 2, 1B will hold the flange 1 in position, allowing the hydraulic pressure to be released and hydraulic nut 21 and packing ring 33 to be removed. A locking nut 35 (FIG. 4), screwed onto thread 32, is then substituted for hydraulic nut 21 to stop the tapered surfaces 2, 1B from working loose during use. Packing (not shown; may be used to align the rear face 36 of the locking nut 35 with the face 37 of flange 1 so that, when flanges 1 and 14 are coupled together via ring of bolts 15, there is no possibility of locking nut 35 working loose and thus releasing the load on the taper surfaces 2, 1B. If key(s) 9 in keyway(s) 10 (FIG. 1) are to be used, these would be inserted prior to using the hydraulic nut 21.

To remove the flange 1 from shaft 4, the following procedure is used. Shaft 13 (FIG. 2) is removed by disconnecting flanges 1, 14 and 12, dismantling thrust block 17 from thrust collar 16 and removing thrust shaft 13. Alternatively, the tailshaft 4 can be moved aft a short distance. Any packing (not shown) and locking nut 35 are removed. Then (having replaced plug 26), hydraulic nut 21 is turned through 180° from its previous disposition (FIG. 3) and screwed onto shaft 4, i.e. with screw threads 31 and 32 enmeshing (FIG. 5). A separation ring 38, with an external circumferential screw thread 39 is screwed into an internal circumferential thread 40 in recess 20 of flange 1. As shown in FIG. 5, the separation ring 38 is machined with a face 41 approximately equal and opposite to face 42 of hydraulic nut 21 so that the separation ring 38 and hydraulic nut 21 will fit together closely, i.e. allowing a long length of contact for screw threads 39 and 40.

Plug 28 is then removed, a source of hydraulic fluid is connected in its place and pressure applied. Thus causes fluid to flow via conduits 25, 24 and 23 into space 34 so forcing piston 29 against the separation ring 38. As separation ring 38 is fast with flange 1 via screw threads 39, 40, the force exerted by piston 29 is transmitted to the tapered surfaces 2, 1B (FIG. 1) and acts in a direction to separate the two members 1 and 4. As the pressure in the hydraulic fluid increases, so the separating force grows until it exceeds the force of friction between the two halves of the taper-fit joint. At this point, the joint separates with flange 1 moving towards the right (FIG. 5). As the separation can be rapid, flange 1 can sometimes move violently; in such cases it is normal for a piece of softer material, e.g. wood, to be placed between the radial face of recess 20 and face 21A of hydraulic nut 21 to protect hydraulic nut 21 from the impact of flange 1 against it. For clarity, this softer material has not been shown. The softer material would be required only where steep tapers are used or where a lubricant is forced into the joint during removal.

The procedures for the use of hydraulic nuts for taper-fit joints usually allow for a greater force to be available to separate the taper-fit joint than to make it. Typical forces would be 200 tonne and 100 tonne respectively. The reason for this is that, on assembly, the tapered parts are usually clean and lightly oiled; though the oil is intended mainly to prevent corrosion, it also acts as a lubricant facilitating slippage of surface 1B over surface 2. When it is time to separate the joint, the mating surfaces 2 and 1B are likely to have been in intimate contact for an extended period of time, e.g. years. During this time, the area of localised welding, formed when the joint was made, may have grown due to diffusion of the metal. Also deformation of the metal caused by creep under high Hertzian stress will have occurred. As tailshaft 4 passes through pressure hull 19 into the cool/cold sea, it will act as a heat sink and so be prone to collect condensation and in spite of the film of oil on the taper joint 2, 1B, ingress of moisture is likely to lead to crevice corrosion. All these factors act together to enhance the strength of the joint, so that it is not uncommon for the force needed to separate it to be nearly twice that used to make it. Thus strongback 7 must be compatible with the separation force, i.e. it will weigh 2-3 tonne in the example instanced of a submarine. In contrast, the separation ring 38 is a much less massive member weighing 100-150 kg, i.e. rather less than the hydraulic nut 21 itself.

Though the example hereinbefore illustrates the assembling and dismantling of a right circular taper-fit joint, the same principle is equally applicable to non-circular taper-fit joints.

I claim:

1. A method of dismantling a tapered frictional joint between
   (i) a first member including a part having an external tapered cross-section and a cylindrical portion co-axial with said part of the first member and provided with an external screw thread to receive a hydraulic nut, and
   (ii) a second member including a part having an internal tapered cross-section compatible with, and in frictional engagement with, the tapered cross-section of said part of the first member which method comprises (a) fitting a hydraulic nut onto the external screw thread of said first member, (b) fitting a separation ring having an external screw thread into a coaxial annular recess provided in the second member and having an internal screw thread for engagement with the external screw thread of the separation ring, said hydraulic nut being capable of exerting an axial force on said separation ring in a direction tending to axially separate the first and second members and (c) actuating the hydraulic nut so as to displace axially and thus separate the first and second members.

2. A method according to claim 1 comprising the step of interposing a relatively soft material between the nut and the first member prior to actuating the nut to prevent impact of the first member on the nut when the members are separated.

3. A tapered frictional joint comprising
   (i) a hydraulic nut having an internal screw thread and capable, on actuation, of exerting an axial force,
   (ii) a first member including a part having an external tapered cross-section and a cylindrical portion coaxial with said part of the first member and provided with an external screw thread to receive the screw thread of the hydraulic nut
   (iii) a second member including a part having an internal tapered cross-section compatible with the tapered cross-section of said part of the first member and also including an annular recess which is coaxial with said part of the second member and has an internal screw thread, and (iv) a separation ring having an external screw thread to be received by the internal screw thread of the recess of the second member wherein, when said hydraulic nut is threadably mounted on the external screw thread of the first member in a first sense and is actuated, axial movement of the second member occurs in a first direction with respect to the first member whereby said tapered parts of the members become nested together and form the joint and wherein, when the separation ring is screwed into said recess and said hydraulic nut is threadably mounted on the external screw thread of the first member in a second sense opposite to the first sense and actuated, the separation ring forms an abutment surface against which the hydraulic nut may react and axial movement of the second member occurs in a second direction, opposite to said first direction, with respect to the first member, whereby said tapered parts of the members become separated to dismantle the joint.

4. A joint as claimed in claim 3 wherein the second member is retained on the first member, once the joint has been formed, by a removable means.

5. A joint as claimed in claim 4 wherein the removable means is a locking nut.

6. A joined as claimed in claim 4 wherein the removable means is a circlip.

7. A joint as claimed in claim 3 wherein the joint additionally includes a cooperating key and keyway.

8. A joint as claimed in claim 3 wherein the joint is in a submarine propulsion drive train, the first member is a tailshaft and the part thereof has a right circular external taper, and the second member is a flange and the part thereof has a right circular internal taper.

* * * * *